United States Patent Office 2,763,630
Patented Sept. 18, 1956

2,763,630

POLY p-XYLENES PLASTICIZED WITH CHLORINATED BIPHENYL

James K. Hubbard, West Chester, Pa., assignor to E. I. du Pont de Nemours and Company, Wilmington, Del., a corporation of Delaware No Drawing. Application February 4, 1953, Serial No. 335,170

13 Claims. (Cl. 260—33.8)

This invention relates to a novel composition of matter. More specifically, it relates to a tractable composition containing a polymer having recurring units of the structure:

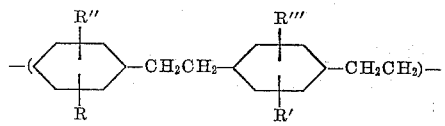

wherein R, R', R'' and R''' represent nuclear hydrogen or one or more substituents for nuclear hydrogen. The hexagon represents the benzene nucleus.

It is known that an intractable solid of the type described above can be prepared by pyrolysis in the vaporous state of p-xylene and/or certain substituted p-xylenes. The product is unworkable because it decomposes at temperatures below its high melting point. Furthermore, it exhibits very low solubility in most solvents.

It is an object of the present invention to prepare a tractable composition of matter containing poly-p-xylene and/or its nuclear substituted derivatives.

Another object is to provide a plasticized composition containing poly-p-xylene and/or its nuclear substituted derivatives.

A further object is to provide a liquid solution of poly-p-xylene and/or its nuclear substituted derivatives.

These and other objects will become apparent in the course of the following specification and claims.

In accordance with the present invention, it has been found that a polymer having recurring units of the type:

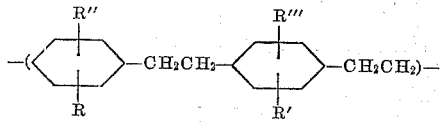

wherein R, R', R'' and R''' represent nuclear hydrogen or one or more substituents for nuclear hydrogen, can be dissolved at high temperature in chlorinated biphenyl having an average chlorine content of at least about 20%. It has also been found that the polymer can be plasticized and rendered tractable by milling it in the powdered form with the same liquid.

The following examples are cited to illustrate the invention. They are not intended to limit it in any way.

Example I 1.07 grams of poly-p-xylene film, prepared as described in British Patent No. 650,947, is suspended in 4.3 grams of chlorinated biphenyl containing an average of 48% by weight of chlorine. The biphenyl derivative is a clear mobile oil having a yellowish tint, a specific gravity (25° C./25° C.) of about 1.45 and a viscosity at 37.8° C. of about 200 Saybolt seconds. The suspension is stirred and the temperature is slowly raised. Solution of the solid begins at about 225° C. and is complete at about 340° C. On slow cooling, precipitation of solid begins at about 225° C.

Example II

A stream of nitrogen is bubbled through 10 grams of the chlorinated biphenyl of Example I. The nitrogen gas acts to provide agitation and to exclude oxygen at the surface. The solvent is heated to 259° C. 0.1 grams of poly-p-xylene flake is added. After 10 minutes it is observed to be completely in solution. The resulting solution is a low viscosity, unsaturated solution. On cooling to 225° C., the solid precipitates.

Example III

The solid and solvent of Example II are combined in the same proportion as expressed in the previous example, under vacuum (1 to 5 mm. pressure) at 302° C. Solution is complete in less than 1 minute.

Example IV

A finely divided dispersion of poly-p-xylene is prepared by passing vapors of p-xylene over the surface of tetrahydronaphthalene. This process, using tetrahydronaphthalene or other suitable liquid, is described in copending application Serial No. 380,195, filed Sept. 15, 1953. The polymer is precipitated by addition of acetone to this dispersion. After filtration the solid is washed with acetone and dried. An equal part by weight of the chlorinated biphenyl described in Example I is added with constant stirring. The powder which results is worked on a Banbury mixer to produce a homogeneous mass. It is a free flowing, light yellow, solid solution.

Example V

The powder produced by Example IV is charged into a melt spinning equipment having a hot needle spinneret which is 2 inches long and has an inside diameter of 0.035 inch. The mass is spun at a temperature of about 280° C. and under a pressure of about 2000 pounds per square inch. A coherent continuous filament results which can be drawn and oriented.

Example VI

The product of Example IV is hot-pressed at a temperature of 305° C. and a pressure of 2000 p. s. i. into a clear continuous film. It is hot drawn to an oriented pellicle.

Example VII

The process of Example IV is varied to produce a powder having a 40/60 ratio of polymer to plasticizer. This product is found amenable both to the spinning and hot-pressed procedures of Examples V and VI.

While the invention has been particularly described with reference to polymers of poly-p-xylene, it is applicable as well to all polymers, copolymers and mixed polymers having the recurring structural unit:

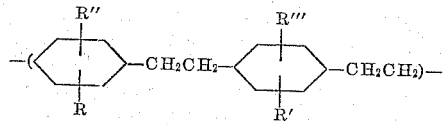

wherein R, R', R'' and R''' represent nuclear hydrogen or one or more substituents for nuclear hydrogen. The preferred specie are those in which R, R', R'' and R''' represent a member of the group consisting of nuclear hydrogen, phenyl, methyl, and halide. The chloride is preferred among the various halides. Among such compounds may be mentioned polypsuedocumene, the copolymer of p-xylene and psuedocumene, polydurene, polychloro-p-xylene, polyphenyl-p-xylene and the like.

By the term "chlorinated biphenyl containing an average of at least about 20% chlorine by weight" is meant a chlorine substituted biphenyl containing from 1 to 10 chlorine atoms. These compounds vary in properties at room temperature from water-white mobile oils through pale yellow viscose oils to solids. They are commercially available under the trade name Aroclor from Monsanto Chemical Company of St. Louis, Missouri. Mixtures of the various compounds are likewise suitable.

A solution of the poly-p-xylene in chlorinated biphenyl is obtained by commingling the materials at a relatively high temperature. The temperature necessary to effect solution will depend both on the identity of the particular chlorinated biphenyl and of the polymer. In general, a temperature of 225° C. is necessary before any appreciable solution is observed. A temperature of from 300° C. to 340° C. has been found to be a convenient working range. The polymer may be in the form of film, flake or powder. It has been observed in the past that the solution of poly-p-xylene occurs in minor amounts in a few scattered solvents. Usually at the high temperatures required for the prior art solvents, considerable decomposition occurs. In accordance with the present invention, it is possible to dissolve poly-p-xylene and/or its substituted derivatives and copolymers under a blanket of nitrogen (Example II) or in a vacuum (Example III). A lowering of the temperature of the solution below about 225° C. causes reprecipitation of the dissolved polymer.

As is illustrated in Example IV above, it is possible to plasticize poly-p-xylene with chlorinated biphenyl by milling a mixture of powdered polymer and chlorinated biphenyl. The physical properties of the resulting product will depend largely upon the amount of plasticizer introduced. A composition containing from about 25% to about 65% plasticizer by weight is generally suitable for the casting of films. Fibers may be spun from those compositions containing from about 40% to about 60% plasticizer. The spinning is conveniently performed within the range of about 250° C. to about 300° C. Pressures as low as about 500 pounds per square inch are operable. Higher pressures, such as 2000 pounds per square inch and above, limited only by the strength of the equipment, may be employed.

Many other modifications of the present invention will be apparent to those skilled in the art, without a departure from the inventive concept.

What is claimed is:

1. A composition of matter comprising a solution of chlorinated biphenyl and a polymer having a recurring structural unit of the formula:

$$-(\langle R'' \atop R \rangle-CH_2CH_2-\langle R''' \atop R' \rangle-CH_2CH_2)-$$

wherein R, R', R'' and R''' represent a member of the group consisting of nuclear hydrogen, an alkyl radical, an aryl radical and a halogen atom.

2. The composition of claim 1 containing at least 25% of the chlorinated biphenyl in solid solution.

3. The composition of claim 2 wherein the polymer is poly-p-xylene.

4. The composition of claim 1 wherein the clorinated biphenyl provides a liquid vehicle for the composition at a temperature of at least about 225° C.

5. The composition of claim 4 wherein the polymer is poly-p-xylene.

6. A process for plasticizing a polymer having a recurring structural unit of the formula:

$$-(\langle R'' \atop R \rangle-CH_2CH_2-\langle R''' \atop R' \rangle-CH_2CH_2)-$$

wherein R, R', R'' and R''' represent a member of the group consisting of nuclear hydrogen, an alkyl radical, an aryl radical and a halogen atom which comprises milling to a homogeneous mass a mixture comprising the said polymer with chlorinated biphenyl.

7. The process of claim 6 wherein the polymer is poly-p-xylene.

8. A process for forming a plasticized film of a polymer having a recurring structural unit of the formula:

$$-(\langle R'' \atop R \rangle-CH_2CH_2-\langle R''' \atop R' \rangle-CH_2CH_2)-$$

wherein R, R', R'' and R''' represent a member of the group consisting of nuclear hydrogen, an alkyl radical, an aryl radical and a halogen atom which comprises hot-pressing a solid solution comprising the said polymer and chlorinated biphenyl.

9. The process of claim 8 wherein the polymer is poly-p-xylene and the hot pressing is accomplished at about 305° C. at a pressure of about 2,000 pounds per square inch.

10. A plasticized film comprising chlorinated biphenyl and a polymer having a recurring structural unit of the formula:

$$-(\langle R'' \atop R \rangle-CH_2CH_2-\langle R''' \atop R' \rangle-CH_2CH_2)-$$

wherein R, R', R'' and R''' represent a member of the group consisting of nuclear hydrogen, an alkyl radical, an aryl radical and a halogen atom.

11. The structure of claim 10 wherein the polymer is poly-p-xylene.

12. A process of dissolving a polymer having a recurring structural unit of the formula:

$$-(\langle R'' \atop R \rangle-CH_2CH_2-\langle R''' \atop R' \rangle-CH_2CH_2)-$$

wherein R, R', R'' and R''' represent a member of the group consisting of nuclear hydrogen, an alkyl radical, an aryl radical and a halogen atom which comprises heating at a temperature within the range of from about 225° to 340° C. a suspension of the polymer in a chlorinated biphenyl having a chlorine content of at least about 20%.

13. A filament comprising chlorinated biphenyl as a plasticizer and a polymer having a recurring structural unit of the formula:

$$-(\langle R'' \atop R \rangle-CH_2CH_2-\langle R''' \atop R' \rangle-CH_2CH_2)-$$

wherein R, R', R'' and R''' represent a member of the group consisting of nuclear hydrogen, an alkyl radical, an aryl radical and a halogen atom.

References Cited in the file of this patent

UNITED STATES PATENTS 2,347,103   Hayes _____ Apr. 18, 1944